United States Patent
Maddahi et al.

(10) Patent No.: US 12,433,250 B2
(45) Date of Patent: Oct. 7, 2025

(54) METHOD AND APPARATUS FOR MONITORING AND/OR CONTROLLING FOOD ACCESS FOR A CAGED ANIMAL

(71) Applicant: TACTILE ROBOTICS LTD., Winnipeg (CA)

(72) Inventors: Yaser Maddahi, Winnipeg (CA); Ali Maddahi, Winnipeg (CA)

(73) Assignee: Tactile Robotics Ltd., Winnipeg (CA)

( * ) Notice: Subject to any disclaimer, the term of this patent is extended or adjusted under 35 U.S.C. 154(b) by 125 days.

(21) Appl. No.: 18/186,289

(22) Filed: Mar. 20, 2023

(65) Prior Publication Data

US 2023/0292706 A1    Sep. 21, 2023

Related U.S. Application Data

(60) Provisional application No. 63/321,368, filed on Mar. 18, 2022.

(51) Int. Cl.
*A01K 5/02* (2006.01)
*A01K 29/00* (2006.01)

(52) U.S. Cl.
CPC .......... *A01K 5/0291* (2013.01); *A01K 29/005* (2013.01)

(58) Field of Classification Search
CPC ........ A01K 5/02; A01K 5/025; A01K 5/0275; A01K 5/0283; A01K 5/0291;
(Continued)

(56) References Cited

U.S. PATENT DOCUMENTS 3,269,358 A * 8/1966 Hawley .................. A01K 1/031
119/458
4,878,455 A * 11/1989 van der Veer ..... A01K 39/0125
119/57.5
(Continued)

OTHER PUBLICATIONS

Ailsa Harvey, "How automatic door mechanisms work", Mar. 25, 2021, Howitworksdaily.com, https://www.howitworksdaily.com/how-automatic-door-mechanisms-work/ (Year: 2021).*

*Primary Examiner* — William L Gmoser
(74) *Attorney, Agent, or Firm* — Ryan W. Dupuis; Michael R. Williams; Ade & Company Inc.

(57) ABSTRACT

A monitoring and/or food/water/medicine control system and method of use of the systems provide that (i) an experimenter at the computer desktop sets the schedule for feeding/fasting (food or water or medicine) the animal according to their need, and the animal's access to food or water or medicine will be set accordingly. This allows animal scientists, experimentalists, and experimenters to fully control animal feeding scenarios; (ii) the experimenter remotely opens and closes the animal's access to food/water/medicine regardless of the pre-set schedule; (iii) the experimenter checks the animal's status via real-time monitoring; (iv) an artificial intelligence system identifies and tracks the animal's location and its activities; and (v) a software module connects the vision unit and feeding mechanism to the experimenter's desktop to provide full control of both the vision unit and the feeding mechanism, to calculate different parameters of the animal's activities, and to report the animal's feeding/fasting history, activity history, and upcoming scheduled feedings.

18 Claims, 6 Drawing Sheets

(58) Field of Classification Search
CPC .... A01K 1/0356; A01K 1/031; A01K 67/033; A01K 29/005
See application file for complete search history.

(56) References Cited

U.S. PATENT DOCUMENTS

| | | | | |
|---|---|---|---|---|
| 5,649,499 | A * | 7/1997 | Krietzman | A01K 5/025 |
| | | | | 119/55 |
| 7,124,707 | B1 * | 10/2006 | Clarke | A01K 5/0291 |
| | | | | 119/61.5 |
| 7,874,265 | B1 * | 1/2011 | Addleman | A01K 5/025 |
| | | | | 119/59 |
| 10,912,288 | B1 * | 2/2021 | Hall | A01K 67/30 |
| 11,653,621 | B2 * | 5/2023 | Bernardini | A01K 1/031 |
| | | | | 119/417 |
| 11,882,811 | B1 * | 1/2024 | Libsack | A01K 5/0291 |
| 2019/0274282 | A1 * | 9/2019 | Black | G08C 17/02 |
| 2020/0260687 | A1 * | 8/2020 | Lee | A01K 5/02 |
| 2021/0127630 | A1 * | 5/2021 | Zimmerman | A61B 5/1118 |
| 2022/0295741 | A1 * | 9/2022 | Southwell | A01K 1/0356 |
| 2023/0148565 | A1 * | 5/2023 | Mayer | A01K 5/0266 |
| | | | | 119/51.02 |
| 2024/0040993 | A1 * | 2/2024 | Brauer | A01K 29/005 |

\* cited by examiner

METHOD AND APPARATUS FOR MONITORING AND/OR CONTROLLING FOOD ACCESS FOR A CAGED ANIMAL

This application claims the benefit under 35 U.S.C.119(e) of U.S. provisional application Ser. No. 63/321,368, filed Mar. 18, 2022.

FIELD OF THE INVENTION

The present invention relates to an automated and smart system used to monitor animals, detect animal activities, and tightly control animal feeding scenarios according to the experimenter's needs for animals kept in laboratory cages.

BACKGROUND

Animal studies, as an inevitable part of biomedical research, require housing rodents in tightly controlled conditions. Researchers are often required to measure a rodent's precise food and water intake and to monitor its behavior, drug ingestion, and exercise intensity and duration. Manually switching between foods and alternating between fasting and fed status can be time-consuming, inconvenient, and challenging, especially when a high number of cages are involved and timing lies on weekends or after hours.

Current State

Traditionally, research institutions hire technicians to manually change the animal's access to food and check its health status in person. Positron emission tomography (PET) and glucose tolerance test (GTT) are two examples of common procedures that demand tight control of food intake. For PET scan, animals must be fasted for 8 hours prior to injection of a radiotracer such as fluorodeoxyglucose (FDG) to visualize the maximum uptake of FDG to the affected tissue. The same principles apply for GTT measurements, and consistency will result in generating data with the least deviation. In order to observe consistent data when dealing with a large number of animals, their fasting must be tightly scheduled. On the human resources front, this means that a trained technician or highly qualified personnel has to remove food every hour between about 3 and 7 AM when a group of mice/rodents are studied. After the experiment is finished, the animal must be isolated for at least 10 half-lives which means one day is roughly needed for after imaging isolation (24 hours). Within that 24 hours, the mouse should be checked to make sure of its well-being.

In addition to the experiments elaborated above, there are several other procedures in the field of animal science in which the animal's activity or animal's well-being must be accurately monitored. These procedures include post-surgical monitoring, humane end-point monitoring, mating strategies, intermittent fasting and diet control for metabolic studies, mice condition post-lethal treatments (LPS), and constant monitoring of animals with musculoskeletal disorders, neurological disorders, behavioral disorders, and systemic and multiorgan disorders. These challenges make the invention of an automatic system for animal food control and activity monitoring very desirable. Most of the commercially available solutions for cage monitoring lack the flexibility to be incorporated with existing home-cages and are, in many cases, based on invasive methodologies such as electromyography (EMG), electroencephalography (EEG), and radio-frequency identification (RFID), which are not ideal for unbiased and high-throughput screening as described in Pack A I, Galante R J, Maislin G, Cater J. Metaxas D, Lu S, Zhanq L, Smith R V, Kay T, Lian J, Svenson K. *Novel method for high-throuqhput phenotyping of sleep in mice. Physiological genomics.* 2007 Jan. 28(2): 232-8. Additionally, non-invasive methods are desirable to obtain results free of experimenter bias as described in Bains R S, Wells S, Sillito R R, Armstrong J D, Cater H L, Banks G, Nolan P M. *Assessing mouse behavior throughout the light/dark cycle usinq automated in-cage analysis tools. Journal of neuroscience methods.* 2018 Apr. 15; 300:37-47.

An open-source system for monitoring food intake and motivation in rodent home-cages was developed and described in Matikainen-Ankney B A, Earnest T, Ali M, Casey E, Wang J G, Sutton A K, Leqaria A A, Barclay K M, Murdauqh L B, Norris M R, Chang Y H. *An open-source device for measuring food intake and operant behavior in rodent home-cages. Elife.* 2021 Mar. 29; 10:e66173. This system consists of a pellet dispenser, two 'nose-poke' sensors for operant behavior, visual and auditory stimuli, and a screen for experimenter feedback. It is able to measure circadian patterns of food intake over multiple days.

There exists a low-cost solution for monitoring the behavior of home-cage rodents that can be incorporated into available rodent home-cage as described in S. Singh, E. Bermudez-Contreras, M. Nazari, R. J. Sutherland and M. H. Mohajerani, "*Low-cost solution for rodent home-cage behavior monitoring*", PLoS ONE, vol. 14(8): e0220751, 19 pages, 2019. In this solution, an infrared (IR) Pi camera module, a wide-angle lens and IR LEDs are placed on the home-cage lid through a custom-made hole at its centroid and sealed with hot glue. This system also uses a Raspberry Pi which connects to the computer network either via a LAN cable or Wi-Fi so that the user can view the live feed of the animal activity in the home-cage via a customized web interface. Also, two offline algorithms for behavioral data analysis and animal tracking in the home-cage are integrated into their system.

A non-invasive cage monitoring system based on electrical capacitance sensing technology was developed and described in Iannello F. *Non-intrusive high throuqhput automated data collection from the home cage. Heliyon.* 2019 Apr. 1; 5(4):e01454. The system is able to provide 24/7 animal activity metrics including distance walked, average speed, activation density, and occupancy directly from the home cage while keeping cages into conventional racks which eliminates the need for dedicated personnel or labs.

An animal containment device was developed as disclosed in Ingley III H A, Hahn D W, Battles A H, inventors: University of Florida Research Foundation Inc, assignee. Rodent cage to accommodate monitoring devices. U.S. Pat. No. 7,497,187. 2009 Mar. 3. The device included a top wall, a bottom wall, a front wall, a rear wall, and at least one sidewall. The device may also include an opening in the rear wall for the insertion of a monitoring module for monitoring the animals within the device. In another aspect, the animal containment device may include walls made from a translucent material having a photosensitive material for controlling the amount of light within the animal containment device. In another aspect, the animal containment device may include one or more sensors in the device and a monitoring linkage and display for displaying the data from the sensors.

A system that provides the automatic remote monitoring and control of the environment of ventilated racks of animal cages and corresponding equipment through wireless interfaces was also developed as disclosed in Coiro M A, Miller S J, Curtin D L, inventors; Coiro Michael A, Miller Steven J, Curtin David L, assignee. Remote animal cage environmental monitoring and control system. United States patent application U.S. Ser. No. 11/473,171. 2007 Nov. 8. The system has a query means for querying a plurality of status parameters of a ventilated rack of animal cages, an evaluation means for evaluating the plurality of status parameters automatically, an alert means for alerting a digital system of the plurality of status parameters, a receiving means receiving control input from the digital system, and a wireless interface for communicating the plurality of status parameters wirelessly to an access point and for communicating the control input wirelessly from the access point to the ventilated rack of animal cages.

A behavioral monitoring system useful for the analysis of complex behaviors in a number of animal species was developed and disclosed in Tecott L H, Gouldinq E, inventors. Animal cage behavior system. U.S. Pat. No. 7,086,350. 2006 Aug. 8. The monitoring systems of this invention allow continuous monitoring of feeding, drinking, and movement of animals with high temporal and spatial resolution. In certain embodiments, the system comprises an enclosure comprising: an animal position indicator; a food consumption indicator; and a fluid consumption indicator, where the system reports behavioral data at a temporal resolution of 20 seconds or lower.

An automatic animal cage monitoring system that includes at least one sensor disposed proximate to a cage for detecting conditions within the cage was developed and disclosed in Ingley III H A, Hahn D W, Battles A H, inventors; University of Florida Research Foundation Inc, assignee. Microfield interface device for monitoring animal cage environments. U.S. Pat. No. 6,998,980. 2006 Feb. 14. The sensor data is transmitted by a wireless transmitter system to at least one remotely located device. The system can simultaneously monitor a plurality of cages. A method for remotely monitoring the conditions associated with an animal within a cage includes the step of obtaining sensor data based on at least one condition within the cage and wirelessly transmitting the sensor data to at least one remote location.

As mentioned earlier, some of the available systems which can be used for monitoring the animal use intrusive methods such as injection of a RFID tag into the body of the animal. In an attempt to provide a system capable of monitoring each individual animal in a group-housed cage with high temporal resolution, a system based on RFID detection was developed and disclosed in Shrestha Y B, inventor; Mouse Works, assignee. System for monitoring feeding behavior of each individual animal in a group-housed cage. United States patent application U.S. Ser. No. 16/036,901. 2019 Jan. 17. Multiple food containers are used in a feeding unit to allow multiple animals to feed freely and simultaneously. Each food container is incorporated with an electronic weight measuring component to continuously monitor the change in food weight in each food container. An electronic RFID tag detector/reader is incorporated at the food accessing opening of each container to identify the animal accessing the food container.

There exists a high throughput system for behavior recognition and motion tracking of rat and mouse. The system is non-invasive as the home cage is placed on top of its motion-sensing table, and it collects behavioral data as described in Hong J I, Park I Y, Kim H A. *Understanding the molecular mechanisms underlying the pathogenesis of arthritis pain using animal models. International Journal of Molecular Sciences.* 2020 January; 21(2):533. The technology is based on measuring the forces induced by the animal's movement and uses pattern recognition algorithms based on artificial intelligence to translate the measured forces in behaviors and tracking information. In this system, the intensity and details of a movement are measured and are independent of any visual device such as camera/light sensors.

Also, a cage monitoring system based on using pyroelectric or passive IR sensors was developed as described in Brown L A, Hasan S, Foster R G, Peirson S N. *COMPASS: continuous open mouse phenotyping of activity and sleep status. Wellcome open research.* 2016; 1. The system is used for phenotyping both circadian rhythms and sleep of mice used in longitudinal measurements of activity and sleep in laboratory mice.

A non-invasive approach utilizing piezoelectric films for rodent sleep/motion detection was developed and described in Flores A E, Flores J E, Deshpande H, Picazo J A, Xie X, Franken P, Heller H C, Grahn D A, O'Hara B F. *Pattern recognition of sleep in rodents using piezoelectric signals generated by gross body movements. IEEE transactions on biomedical engineering.* 2007 Jan. 22; 54(2):225-33. In this system, piezoelectric film strips were attached to the floor of the rodent cage. The strips produce an electrical output in direct proportion to the distortion of the material. During sleep, movement associated with breathing is the predominant gross body movement; therefore, output from the piezoelectric transducer provided a respiratory trace during sleep. While awake, respiratory movements are masked by other motor activities, and a pattern recognition system was developed to identify periods of sleep and wake using the piezoelectric generated signal.

A simplified microwave-based motion detector for home cage activity monitoring in mice was developed and described in Genewsky A, Heinz D E, Kaplick P M, Kilonzo K, Wotjak C T. *A simplified microwave-based motion detector for home cage activity monitoring in mice. Journal of biological engineering.* 2017 December; 11(1):1-2. In this system, the wave generator is located next to the mouse cage and emits electromagnetic waves to the mouse cage. The reflection wave with modulated frequencies is sent to the motion detector and processing unit to detect and save the history of the mouse motion.

Currently, trained technicians are required for food control and activity monitoring in animal research experiments. This requirement is expensive, inconvenient, and restrictive for experiments on many occasions. However, if food control and activity monitoring can be accomplished using an automated, programmable, and remotely controllable system, the experimenters can conduct their experiments in a far more convenient way and at increased capacity. Currently, no programmable and schedulable food control mechanism is available that also gives the experimenter full remote control of animals' access to food without altering the structure of the existing equipment. Also, the available systems for activity monitoring of animals are either too expensive to incorporate into the laboratory equipment, need an alteration in the current structure of the cage and laboratory facility, or are based on invasive methods. The proposed invention represents an efficient, affordable, and fully controllable solution to the current issue in biomedical research laboratories around the world and leads to a considerable amount of saving in time and expenses.

SUMMARY OF THE INVENTION

According to one aspect of the invention there is provided a control apparatus for controlling access of an animal in a cage to a consumable, the cage including a receptacle suspended within the cage and supporting the consumable therein such that the consumable is accessible to the animal in the cage through an access opening of the receptacle, the control apparatus comprising:

an access door arranged to be supported for movement relative to the receptacle between closed position blocking access of the animal in the cage to the access opening of the receptacle and an open position in which the access opening of the receptable is substantially unobstructed by the access door;

a door actuator arranged to drive displacement of the access door between the open position the closed position; and a controller comprising a memory storing programming instructions thereon and a processor arranged to execute the programming instructions stored on the memory whereby the controller is arranged to actuate the door actuator to open and close the access door according to respective scheduled times stored on the controller.

The controller may be further arranged to operate the door actuator to position the access door in an intermediate position partway between the open position and the closed position wherein access of the animal in the cage to the access opening of the receptacle is partially restricted in the intermediate position.

When the cage includes a lid arranged to be seated on a top side of the cage to enclose the cage, the apparatus is preferably arranged to be supported within the cage without interference to the lid enclosing the top side of the cage.

The controller preferably includes a data transmission module arranged for communication with a remote computer device over a communication network in which the controller is arranged to change the scheduled times stored on the controller in response to an instruction received from the remote computer device over the communication network.

The controller may also be arranged to record each actuation of the access door by the door actuator in an event log and transmit the event log to the remote computer device over the communication network.

The apparatus may also include one or more sensors arranged to measure one or more operating characteristics of the access door when displacing the access door towards the closed position. In this instance, the controller is preferably arranged to instruct the door actuator to open the access door and subsequently fully or partially close the access door after a prescribed duration has expired in response to the one or more operating characteristics measured by the one or more sensors indicating the access door has encountered an obstruction while closing. The controller may also be arranged to generate an alert communicated to a user of the apparatus in response to the one or more operating characteristics measured by the one or more sensors exceeding a prescribed threshold stored on the controller.

The access door is preferably supported for linear sliding movement parallel to a plane of the access door between the open position and the closed position. The door actuator may comprise a rotary motor operatively coupled to the access door by a linkage for driving the linear sliding movement of the access door.

When the receptacle is suspended in the cage at a location spaced above a bottom of the cage, the access door is preferably arranged to extend below the receptacle in the closed position.

When the receptacle comprises a receptable grate in which the access opening of the receptacle comprises a plurality of openings between respective bars of the receptacle grate, preferably the access door, the door actuator, and at least a portion of the controller are supported on a common housing of the apparatus in which the common housing is releasably attached to the receptacle grate.

The control apparatus may be used in combination with a monitoring apparatus that monitors the animal in the cage. In this instance, the monitoring apparatus preferably comprises: (1) a camera unit arranged to be supported in proximity to the cage, the camera unit including (i) a camera arranged to capture images of the cage with the animal therein, and (ii) a data transmission module arranged to transmit the image data as a time-series of captured images to the computer device; and (2) a memory storing programming instructions arranged to be executed by a computer device separate from the camera unit whereby the computer device is configured to: (i) calculate a movement metric representative of movement of the animal relative to the cage over time by processing the time-series of captured images to identify the animal in each image, identifying a location of the animal relative to the cage in each image, comparing the captured images to one another to determine one or more movements of the animal relative cage over time, in which the movement metric is representative of said one or more movements; and (ii) communicate with the controller of the control apparatus so as to be arranged to change the scheduled times stored on the controller in response to an instruction received by the controller from the computer device.

According to another aspect of the present invention there is provided a control apparatus for controlling access of an animal in a cage to a consumable, the cage including a receptacle suspended within the cage and a lid arranged to be seated on a top side of the cage to enclose the cage, the receptacle supporting the consumable therein such that the consumable is accessible to the animal in the cage through an access opening of the receptacle, the control apparatus comprising:

an access door arranged to be supported for movement relative to the receptacle between closed position blocking access of the animal in the cage to the access opening of the receptacle and an open position in which the access opening of the receptable is substantially unobstructed by the access door;

a door actuator arranged to drive displacement of the access door between the open position and the closed position; and a controller comprising a memory storing programming instructions thereon and a processor arranged to execute the programming instructions stored on the memory whereby the controller is arranged to actuate the door actuator to open and close the access door;

wherein the apparatus being arranged to be supported within the cage without interference to the lid enclosing the top side of the cage.

According to another aspect of the present invention there is provided a monitoring apparatus for use with a computer device for monitoring activity of an animal in a cage, the apparatus comprising:

a camera unit arranged to be supported in proximity to the cage, the camera unit including (i) a camera arranged to capture images of the cage with the animal therein, and (ii) a data transmission module arranged to transmit the image data as a time-series of captured images to the computer device; and a memory storing programming instructions arranged to be executed by the computer device so as to be configured to:

process the time-series of captured images by applying a deep learning algorithm to the captured images to identify the animal in each image;

identify a location of the animal relative to the cage in each image; and compare the captured images to one another to determine one or more movements of the animal relative cage over time.

In this instance, the programming instructions may be further arranged to be executed by the computer device such that the computer device calculates a movement metric representing the one or more movements of the animal and generates a graphical display which represents the calculated movement metric.

The programming instructions may also be arranged to be executed by the computer device such that the computer device compares said one or more movements to an irregular movement criterium and generates an alert to the user if the one or more movements meets the irregular movement criterium.

When the computer device is located remotely from the camera unit, the data transmission module of the camera unit may be arranged to transmit the image data to the computer device over a communications network.

When the computer device comprises a remote server, the programming instructions may be arranged to be executed by the computer device such that the remote server is arranged to transmit the one or more movements of the animal determined by the remote server over the communications network to a user device which is separate from the remote server and the camera unit.

The camera unit may include one or more light sensors arranged to measure light conditions such that the camera unit is arranged to adjust at least one performance characteristic of the camera in response to the light conditions measured by the one or more light sensors.

The camera unit may be arranged to transmit the captured images to the computer device in real-time and wherein the programming instructions are arranged to be executed by the computer device such that the computer device processes the captured images in real-time and records the determined one or more movements in a log that can be subsequent recalled by a user.

This invention provides a smart food control and monitoring system including a control apparatus and a monitoring apparatus that can be used together or independently of one another for experiments conducted on animals in the fields of biomedical research and animal science. More particularly, the invention (hereafter called smart food control and monitoring system) relates to a smart food control and monitoring system for research in animal science comprising a setup having (i) at least one feeding mechanism or control apparatus to control the animal's access to food, arranged to have an actuator for linear displacements of the food access door, (ii) at least one vision unit or monitoring apparatus with a set of camera/sensors, a video streaming and data transmission system that could use a wireless or wired communication network, and (iii) custom-designed interface software in the form of programming instructions stored on a memory to be executed by a processor to set the feeding/fasting schedule, change animal's access to food, monitor the animal, and calculate and analyze animal activity metrics/parameters.

The control apparatus is a feeding mechanism which is mounted on/within a cage comprises (i) a custom-designed prismatic mechanism for opening and closing the food access door; (ii) an actuation system embedded in the custom-designed prismatic mechanism so as to generate necessary inputs to drive the main shaft connected to the food access door; (iii) a processing unit arranged to operate and control the actuation system of the custom-designed prismatic mechanism; (iv) a software arranged to be used as an interface program of at least one said feeding mechanism; (v) a data transmission system to send/receive the data to/from software through wired or wireless connection including Wi-Fi or Bluetooth.

The vision unit or monitoring apparatus, which is placed in proximity of a cage, comprises a camera to capture the animal's photo and generate visual representations, photos, and videos of the animal; a sensory system so as to sense the light level; a software arranged to be used as an interface program of at least one said vision unit; a video streaming system that sends the photos and videos of the animal to the software; a processing unit arranged to receive the sensory system data; control the camera, analyze the light level, and transmit the data to the software, and a data transmission system to send/receive the data to/from software through wired or wireless connection including Wi-Fi or Bluetooth.

The invention is useful for conducting experiments on rodents, mice, and other small animals for biomedical research purposes. However, the application could be extended to other fields of health sciences such as zoology and large animal science.

The invention provides the experimenter with the ability to set a schedule for fasting/feeding the animal, remotely change the animal's access to food, view the history of the animal's food access during the entire period of the experiment, monitor the animal in a real-time manner, and examine the record of the animal's activity and its metrics/parameters.

According to another aspect of the invention, the feeding mechanism along with the vision unit comprise (i) a custom-designed prismatic mechanism for opening and closing the food access door; (ii) an actuation system embedded in the custom-designed prismatic mechanism so as to generate necessary inputs to drive the main shaft connected to the food access door; (iii) a processing unit arranged to operate and control the actuation system of the custom-designed prismatic mechanism; (iv) a software arranged to be used as an interface program of at least one said feeding mechanism; (v) a camera to capture the animal's photo and generate visual representations, photos, and videos of the animal; (vi) a sensory system so as to sense the light level; (vii) a software arranged to be used as an interface program of at least one said vision unit; (viii) a video streaming system that sends the photos and videos of the animal to the software; (ix) a processing unit arranged to receive the sensory system data, control the camera, analyze the light level, and transmit the data to the software; (x) a data transmission system to send/receive the data to/from software through wired or wireless connection including Wi-Fi or Bluetooth.

The control apparatus of the invention may have a wired connection to at least one said vision unit where the data processing and data transmission takes place within the vision unit.

The control apparatus may have a custom-designed mechanical arrangement that opens the food access door using a rotational mechanism.

The control apparatus has a sensory system and the processing unit of the feeding mechanism is preferably arranged to control the actuation system by comparing at least one angular displacement, linear displacement, angular velocity, or linear velocity sensed by the sensory system.

The monitoring apparatus may be based on sonar, heat-seeking, thermal screening, electromagnetic, piezoelectric, force transducer, or microwave systems.

The processing unit of the control apparatus may be arranged to generate an alert if at least one angular displacement, linear displacement, angular velocity, or linear velocity sensed by the sensory system of the custom-designed feeding mechanism deviates from at least one angular displacement, linear displacement, angular velocity, or linear velocity that is calculated to be the desired value according to the pre-set schedule by the experimenter.

The processing unit of the monitoring apparatus generates an alert if the detected animal's motion is very low, very high, or deviates from a pre-set value determined by the experimenter.

The smart monitoring and food control system in some instances includes a single control apparatus, yet in other instances includes a plurality of control apparatuses.

The smart monitoring and food control system in some instances includes a single monitoring apparatus, yet in other instances includes a plurality of monitoring apparatuses.

The smart monitoring and food control system in some instances includes both a plurality of vision units or monitoring apparatuses and a plurality of feeding mechanisms or control apparatuses.

The feeding mechanism or control apparatus of the invention may control the animal's access to food, drug, medicine, or any other solid or gelatine material intended or prescribed to be taken by the animal.

The feeding mechanism or control apparatus of the invention may control the animal's access to water, liquid medication, or any other liquid intended or prescribed to be taken by the animal.

The sensory system of the control apparatus may comprise gyros arranged to measure linear/angular displacement of the food access door.

The sensory system of the control apparatus may comprise linear or rotary encoders arranged to measure linear/angular displacement of the food access door.

The sensory system of the control apparatus may comprise inertial sensors including gyros, encoders, and accelerometers and any combination of inertial sensors with ultrawideband systems to measure positions of the food access door.

The actuation system of the control apparatus may comprise a combination of electromagnetic, hydraulic, pneumatic, piezoelectric, muscle wire, piezo-ultrasonic, ultrasonic, tactile, electrostatic, electro-rheological fluid-based, or polymer-based actuator, or a manual actuation system.

The sensory system of the monitoring apparatus may comprise a thermal camera to measure the body temperature of the animal.

The sensory system of the monitoring apparatus may comprise a Gamma camera to measure the hotness and radiation level of the body of the animal.

The invention may include a light control system which changes operation of the cameras between dark and light cycles of the animal's enclosure based on a given schedule.

The invention may further comprise a kit comprising the custom-designed feeding mechanism according to any aspect of the present invention noted above and a sheet of instructions for use thereof.

According to another independent aspect of the present invention, there is provided a kit comprising the custom-designed vision unit according to any aspect of the present invention noted above and a sheet of instructions for use thereof.

According to another independent aspect of the present invention, there is provided a method of use of as described above where the procedure includes any one, or all, of food control, drug ingestion, activity monitoring, and circadian activity analysis.

According to another independent aspect of the present invention, there is provided a method of use of as described above where the procedure includes any one, or all, of FDG-PET Scan, peripartum monitoring, peri-surgery monitoring, mating strategies, intermittent fasting and diet control for metabolic studies, mice condition post-lethal treatments (LPS), musculoskeletal disorders, neurological disorders, behavioral disorders, systemic and multiorgan disorders.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The invention helps the experimenters in the field of animal science and biomedical research to conveniently schedule and control the animal's access to food and monitor their status. It is a programmable, sensorized, and easy-to-handle food control and cage monitoring system which is designed to provide tightly controlled conditions where food intake, behavior, and intensity of the animal's activity are required to be accurately measured. It eliminates the need for technicians to manually control the feeding/fasting schedule of the animal. It also gives the operator remote access for condition control and monitoring. The feeding mechanism or control apparatus 2 and the vision unit or monitoring apparatus 3 are connected to the interface program in the form of programming instructions on a suitable computer readable memory using wired or wireless connections.

The feeding mechanism 2 is designed to be mounted on conventional cages used in most research centers and has a sliding mechanism that can enable/disable the animal's access to food. The mechanism will change the food access according to the schedule set by the experimenter. Besides this and regardless of the pre-set schedule, the experimenter is also able to change the food access by opening/closing the food access door using the built-in function of the interface program. The interface program can also provide the history of the animal's access to food and change the food access schedule conveniently and according to the experimenter's needs.

The vision unit 3 takes advantage of a set of light sensors, a camera, and a trained animal detection algorithm based on artificial intelligence or neural network. The camera may be used for remote monitoring of the animal, which is needed in many applications such as post-surgical monitoring, humane end-point monitoring, and pregnancy/mating strategies monitoring. The vision unit is connected to the interface program and provides a live video stream of the animal on the experimenter's computer. Also, as is required in many biomedical research studies, the vision unit is able to detect the animal and its location within the cage and provide a history of the animal's activity, its location, and the required statistics and analytics for the experimenter.

Figure 1:
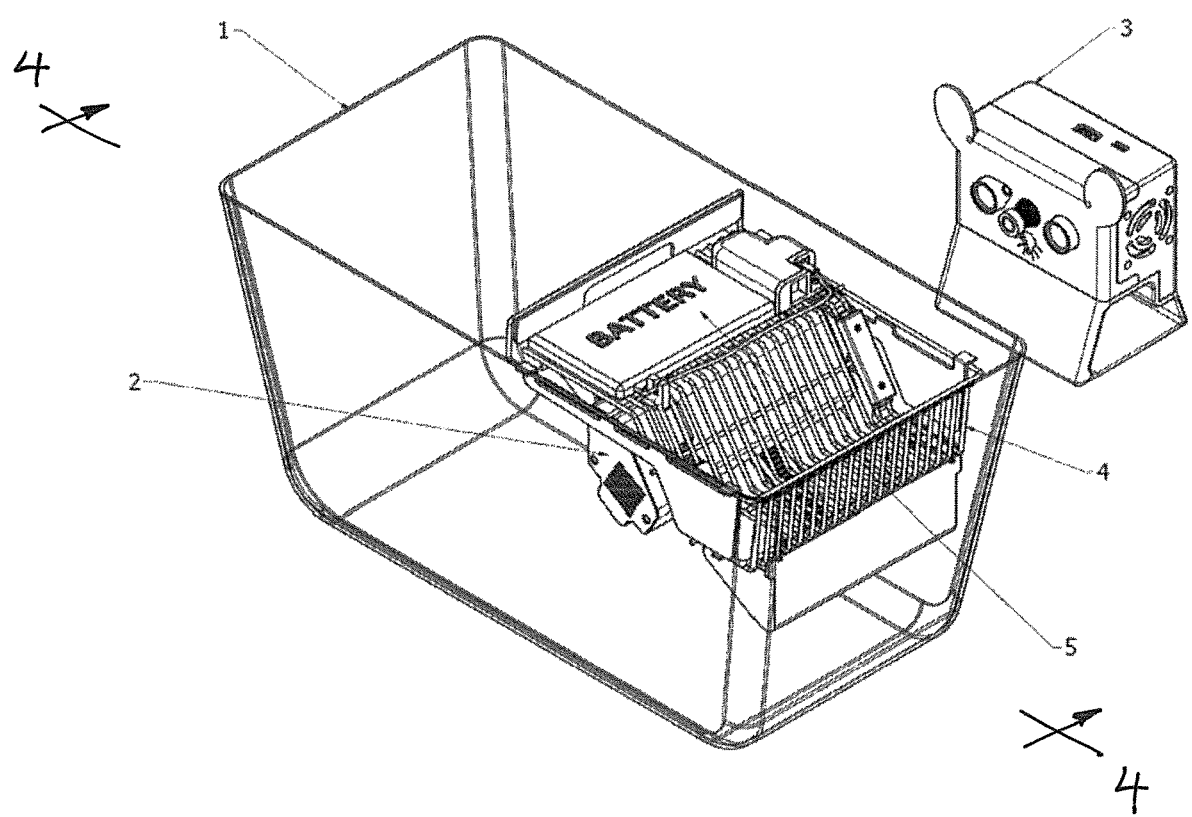
FIG. 1 is a perspective of the control apparatus and the monitoring apparatus in relation to an animal cage.

FIG. 1 presents the overall scheme of the apparatus. Said animal cage 1 is the location where said feeding mechanism 2 will be mounted. The feeding mechanism 2 dispenses the food to the animal according to the pre-set feeding/fasting schedule. Said vision unit 3 is placed next to or in a distance on top of the plastic frame 1 to detect the animal and monitor and record its activity.

Figure 2:
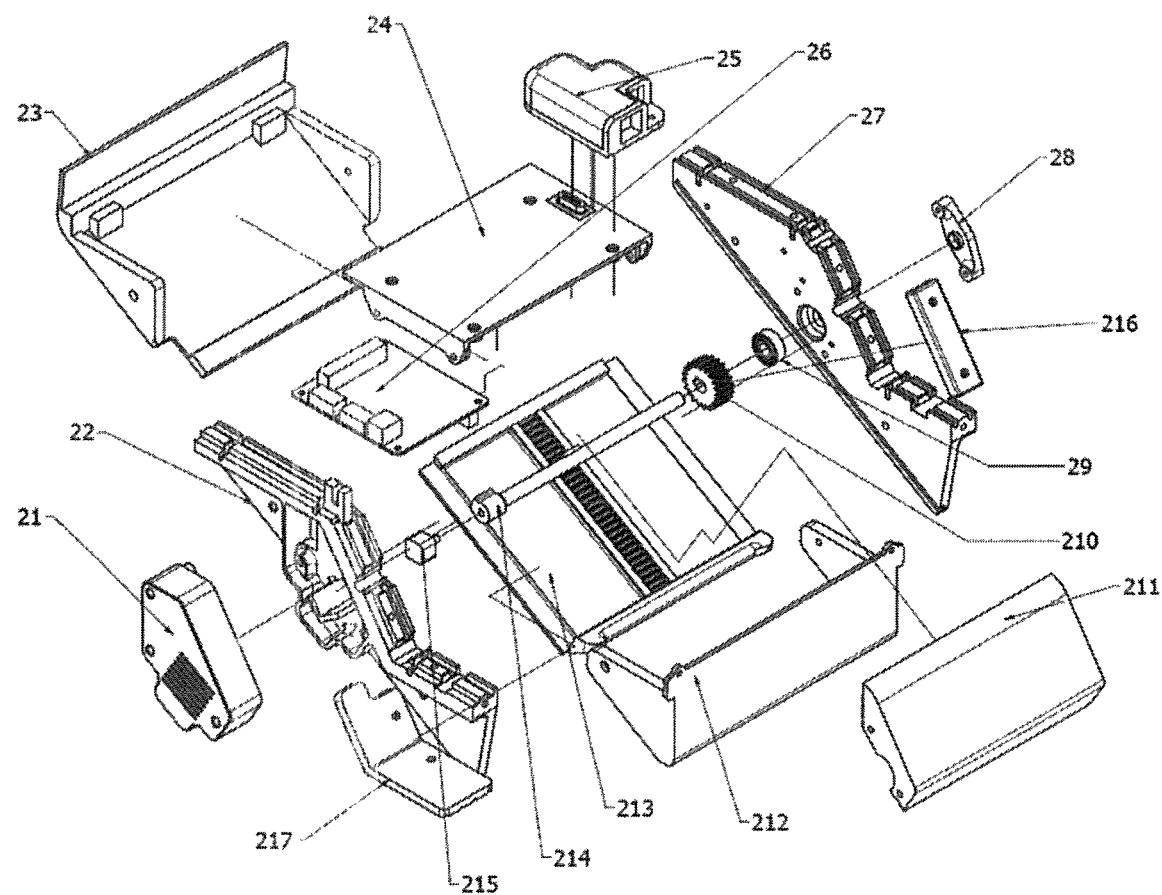
FIG. 2 an exploded perspective view of the components of the control apparatus of FIG. 1 for mounting onto the food receptacle of the animal cage to support the control apparatus within the animal cage.

FIG. 2 presents different components used in said feeding mechanism 2. The power supply 5 is connected to connector 25 located on the board plate 24 and the processing unit 26 is turned on. The processing unit 26 then enables the actuator 215 and it turns the shaft 214 according to the pre-set schedule. The shaft 214 transmits the motion to the food access door 213 using gear 210 and converts the rotational motion to translational motion.

The actuator 215 is mounted on the left bracket 22 which is itself connected to the food container 4 using the holding bracket 217. The actuator enclosure 21 is also connected to the left side of the left bracket 22. The left end of shaft 214 is connected to the actuator 215 and passes through the gear 210 and its right end goes through bearing 29, which is mounted on the right bracket 27 and is connected to the shaft cap 28. The right bracket is also connected to food container 4 using the holding bracket 216. The back and front of the feeding mechanism 2 are covered by the back cover 23 and the front cover 212. The mid shield 211 covers shaft 214 and the gear 210 to stop the animal's access to them and prevent possible damages.

Figure 3:
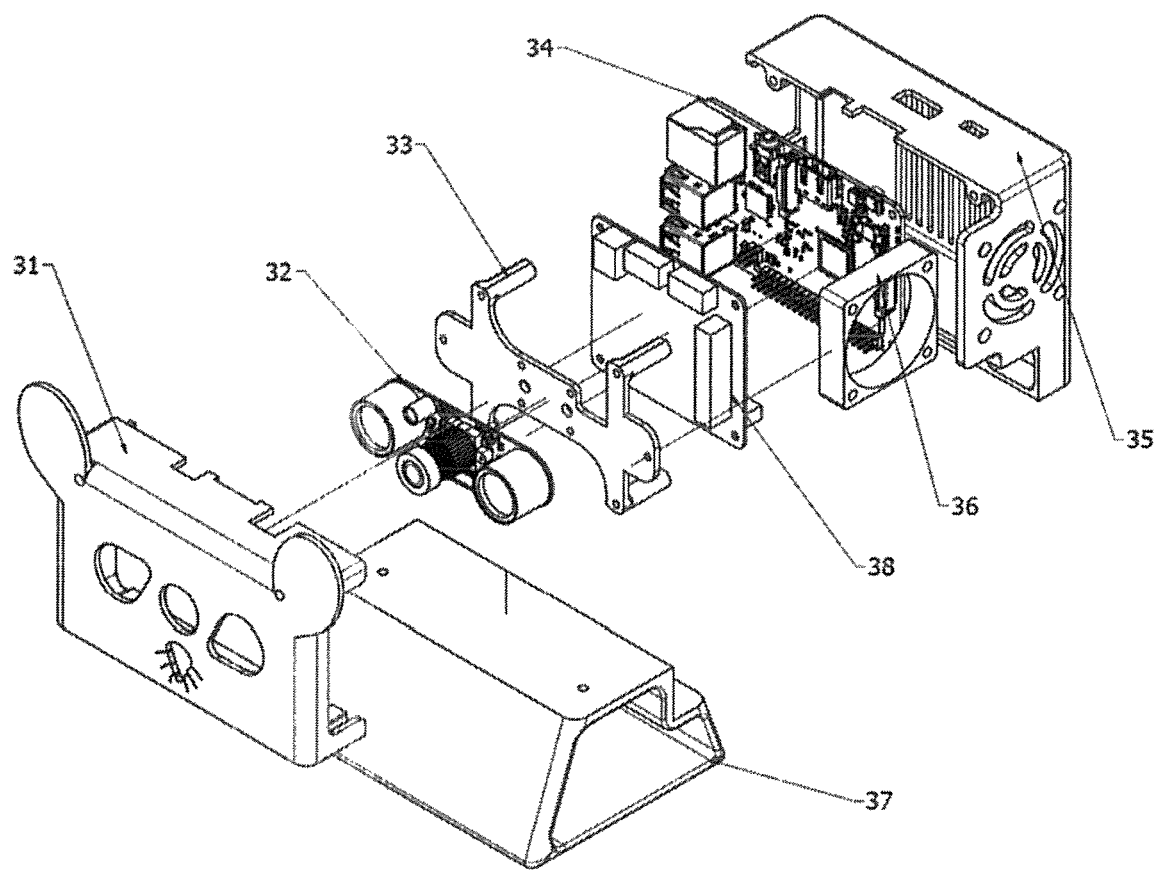
FIG. 3 is an exploded perspective view of the components of the monitoring apparatus according to FIG. 1 for monitoring an animal within the animal cage.

FIG. 3 presents the details of the vision unit 3. The vision camera/sensors 32 send the captured frames to the processing unit 34, which in turn sends the data to the interface program. Unit controller 38 is the alternative element to the processing unit 26 in feeding mechanism 2 if the system is based on wired communication instead of wireless data transmission. The cooling fan 36 cools down the processing unit 34. The vision camera/sensor 32 is mounted on the supporting bracket 33. The front cover 31 and the back cover 35, together, enclose the assembly of the vision camera/sensors 32, the supporting bracket 33, the unit controller 38, the processing unit 34, and the cooling fan 36, while the whole assembly is mounted on the stand base 37.

Figure 4:
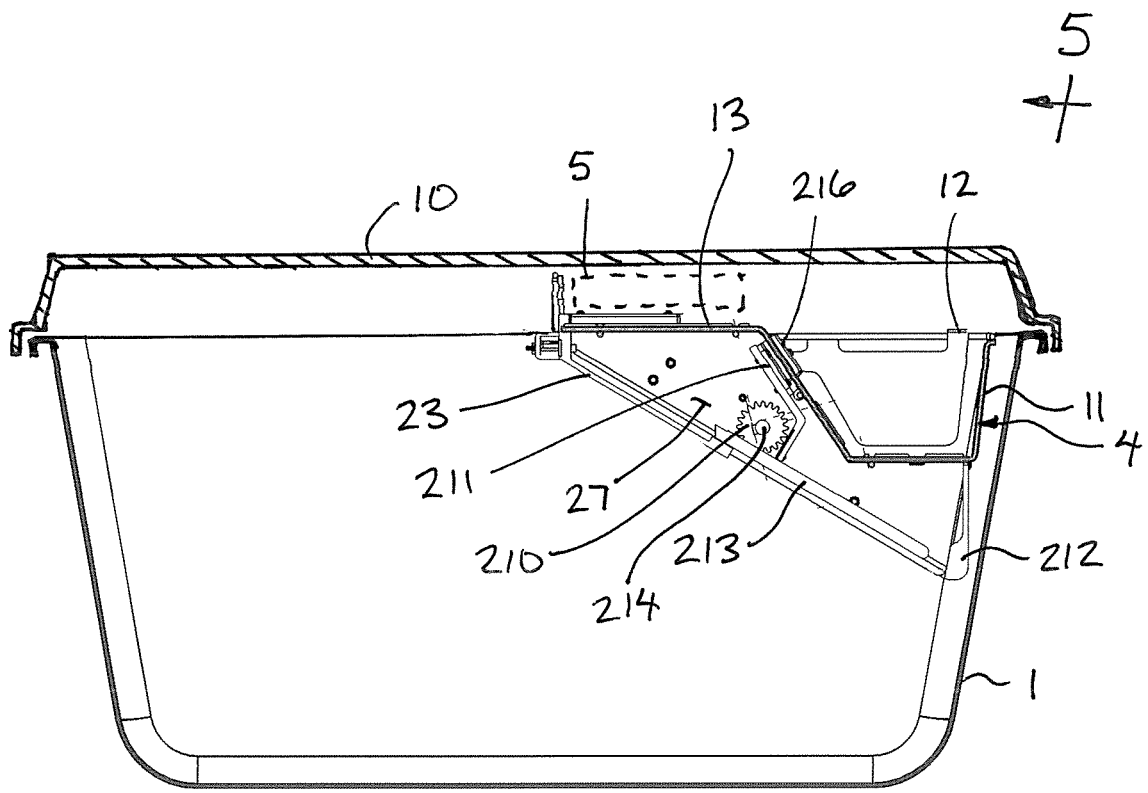
FIG. 4 is a partly sectional view of the control apparatus along the line 4-4 in FIG. 1.
Figure 5:
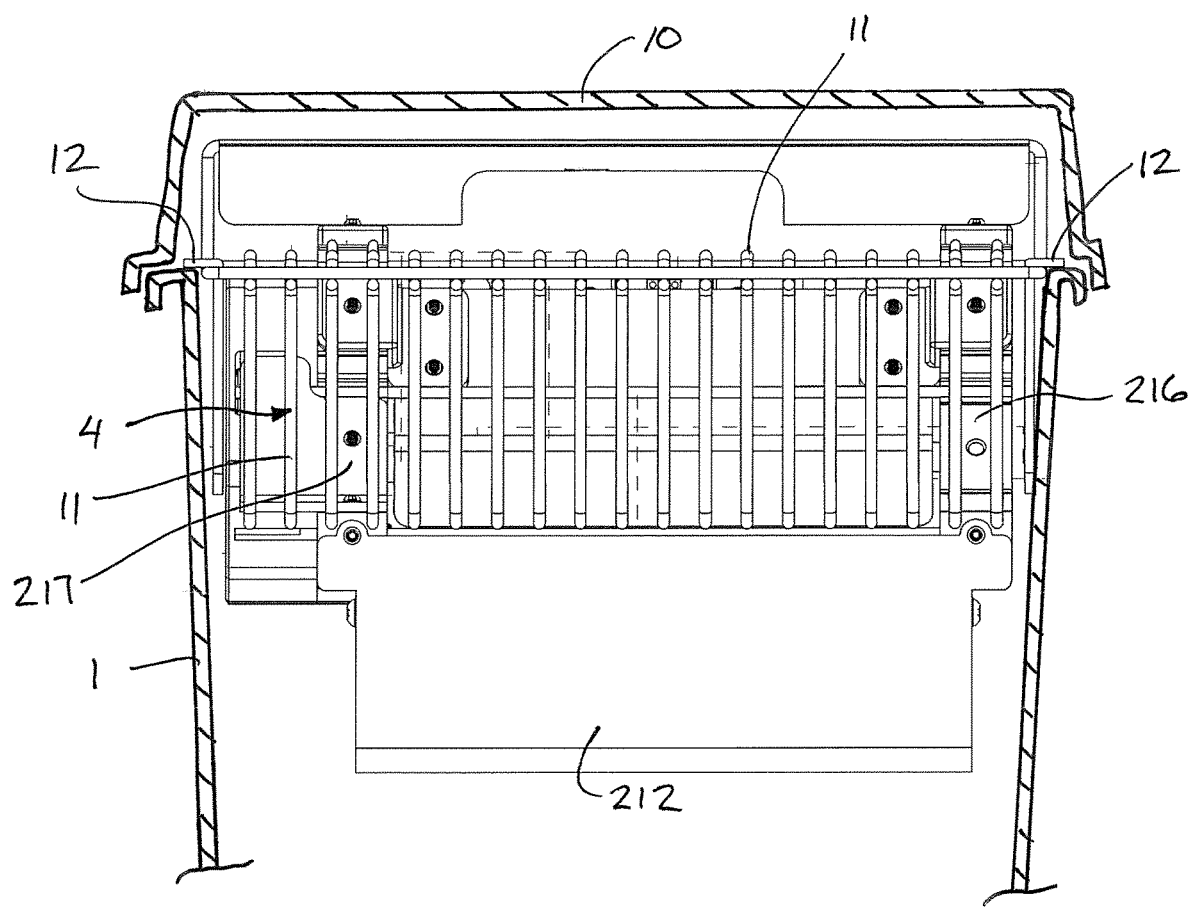
FIG. 5 is a partly sectional view of the control apparatus along the line 5-5 in FIG. 4.

FIG. 4 presents different components used in the whole system. The feeding mechanism 2 and the vision unit 3 are mounted on plastic frame 1 and placed next to or in a distance on top of plastic frame 1, respectively, while both have established a connection with interface software 6. The experimenter can see the real-time video streaming, access the feeding/fasting history of the animal, set the feeding/fasting schedule, and access the history of the animal activity using the interface software 6. The connection between the interface software 6, the feeding mechanism 2, and the vision unit 3 can be local or cloud-based.

Referring to the accompanying figures, the control and monitoring system for managing care of an animal within a cage will now be described in further detail. The system includes a control apparatus 2 for controlling access to one or more consumables, for example food, water, medicine and the like, and a monitoring apparatus 3 for monitoring movement activity of the animal relative to the boundaries of the cage.

Within the context of this invention, the animal cage 1 is understood to comprise any form of enclosure for containing an animal in preventing escape of the animal by use of boundary walls including a floor and upright sidewalls formed of various materials and a lid for enclosing a top side of the cage in some instances. The walls may comprise any suitable barrier for containing the animal including (i) wire grates formed of bars with gaps between the bars that are sufficiently small to prevent the animal escaping therethrough, (ii) continuous sheet material such as rigid, transparent, plastic walls commonly used in cages for laboratory animals, or (iii) a barrier having one or more openings therein in which the openings are sufficiently small to prevent passage of the animal therethrough, or (iv) any equivalents to the barriers described above which are suitable for containing the animal.

According to the illustrated embodiment, the cage 1 comprises a container having a floor and walls extending upwardly about the full perimeter of the floor which are collectively formed as a unitary body of solid plastic material that is transparent for viewing the animal within the cage. The upright perimeter walls of the cage 1 terminate in a common plane at the top of the cage to define a horizontal ledge about the full perimeter of the open top end of the container.

A lid 10 is provided for fully enclosing the open top end of the lower container portion of the cage 1. The lid 10 includes a perimeter flange which is arranged to be seated on the ledge at the top end of the perimeter walls of the cage 1 in a closed position of the lid. A depending flange extends downward from the outer edge of the perimeter flange to overlap a corresponding exterior surface of the boundary walls about the full perimeter of the lower container portion to centre the lid 10 in longitudinal and lateral directions relative to the lower container portion of the cage 1. The lid also includes a perimeter wall extending upward from the inner edge of the perimeter flange and a top panel that fully encloses the top end of the lid such that the lid fully encloses the open top of the lower container portion of the cage when the lid 10 is seated on the lower container portion.

The food container 4 comprises a receptacle for receiving a consumable therein such as dry solid food pellets commonly used for feeding laboratory mice and rats. In the illustrated embodiment, the food container 4 comprises a grate formed of bars extending parallel to one another at spaced apart positions along a length of a trough portion 11 of the container 4. The trough portion 11 is generally U-shaped and extends substantially the full width of the cage 1 in the lateral direction while being enclosed at laterally opposing ends of the trough by suitable side panels.

A set of support flanges 12 are provided on the food container 4 such that each of the laterally opposed side edges of the food container 4 usually comprises two or more support flanges 12 at longitudinally spaced positions to protrude laterally outwardly beyond the side boundaries of the food container 4 adjacent a top end of the trough portion that receives the consumable product therein. The support flanges 12 are thus suitably arranged for sitting on the ledge of the lower container portion of the cage 1 at spaced positions along two laterally opposed sidewalls of the lower container portion of the cage 1. The support flanges 12 lie against the top of the ledge of the cage 1 so as not to interfere with mounting of the lid onto the lower container portion of the cage 1.

When the consumable comprises food pellets, the food pellets are typically sized such that they will not fit through the gaps between the bars of the grate forming the trough portion of the food container 4; however, the gaps in the food container are sufficiently large to allow the mouth of the animals to partly reach through the gaps to access the food pellets for biting off pieces of the food pellets such that the gaps between the bars define access openings of the food container 4 through which the animal in the cage can access the food. The trough is typically suspended at a location spaced above the bottom of the cage such that the animal must reach up through access openings in the bottom of the trough to access the food within the food container 4.

The grate of the food container 4 also includes a platform portion extending generally horizontally in the longitudinal direction from an inner boundary edge of the trough portion 11 at the top of the trough. The platform portion lies substantially in a common plane with the ledge at the top edge of the lower container portion of the cage 1 in a mounted position by being supported by the support flanges 12 relative to the cage 1. An end wall extends upwardly from an inner end of the platform furthest from the trough portion 11 such that the end wall spans substantially a height of the lid 10 to prevent access by animals within the cage to the area above platform portion and trough portion of the food container 4.

The control apparatus 2 includes a common housing collectively formed by the left and right brackets 22 and 27 with the back cover 23, the front cover 212, and the mid-shield 211 mounted thereon. The common housing is entirely supported on the cage 1 by mounting of the common housing onto the food container 4 which is in turn supported on the cage 1 by the support flanges 12 as described above. In this manner, the control apparatus 2 is well suited to being mounted in a similar manner on stationary a the existing stationary food container of various types of animal cages.

More particularly, the common housing is primarily supported below the platform portion 13 of the food container 4 while also extending partly beneath the trough portion 11. The left bracket 22 and the right bracket 27 defined laterally opposing end walls of the common housing and have an upper edge that follows the bottom profile shape of the platform portion 13 and part of the profile of the trough portion 11. One or more holding brackets 216 and 217 are supported above the bars of the grate forming the food receptacle 4 for forming a fastened connection to the left and right brackets 22 and 27 respectively through the gaps between the bars of the grate. In this manner portions of the bars are clamped between the holding brackets 216 and 217 above the grate and the left and right brackets 22 and 27 below the grate.

The back cover 23, the front cover 212 and the mid-shield 211 all span laterally across the width of the common housing for being mounted at opposing ends on the left and right brackets 22 and 27.

The back cover 23 comprises an end wall spanning the lateral width of the cover at the top end for mounting alongside the upright end wall of the food container 4 at the inner end of the platform portion 13. A sloped wall of the back cover extends longitudinally from the end wall towards the bottom of the trough at a downward slope to a bottom edge situated at a location spaced below the junction of the platform portion 13 and the trough portion 11 of the food container 4 above. The back cover further includes two triangular side walls enclosing the laterally opposing ends of a triangular space between the platform portion of the food container 4 above and the sloped wall of the back cover below.

The mid-shield 211 is arranged to be supported along an inner boundary of the trough portion of the food container and further extends downward to a bottom edge in proximity to a lower boundary of the left and right brackets 22 and 27 while being further located in proximity to the bottom boundary edge of the back cover 23. A slot is defined spanning laterally across the width of the common housing between the bottom edge of the mid-shield 211 and the bottom edge of the sloped wall of the back cover 23 below for receiving the access door 213 through the slot as it is displaced between open and closed positions described further below.

An enclosed space is defined between the platform 13 above, the back cover 213 below and the mid-shield 211 which contains the operating linkage of the access door as described in further detail such that the operating linkage is not accessible to animals in the cage even when the access door is open.

The front cover 212 comprises an upright end wall supported at its top edge in proximity to the bottom of the trough portion 11 of the food container 4 to extend downward therefrom along the end wall boundary of the cage 1 to a bottom edge of the front cover 212 that remains spaced above the bottom of the cage 1 adjacent an end wall of the cage 1. The front cover further includes a pair of side walls that are generally triangular in shape at laterally opposing ends of the front cover so as to be parallel to one another and to enclose a triangular space bound by the bottom of the trough portion 11 at the top, by the end wall of the front cover at one end, and by the lower boundaries of the left and right brackets 22 and 27.

A door opening is defined in the bottom of the common housing which lies substantially in a common plane with the sloped wall of the back cover 23. More particularly, the door opening spans in a longitudinal direction of the cage 1 between the bottom edge of the sloped wall of the back cover 23 and the bottom edge of the upright end wall of the front cover 212, and spans in a lateral direction of the cage 1 between bottom edges of the left and right brackets 22 and 27.

The access door 213 is a rigid panel of material mounted parallel against the sloped wall of the back cover while being supported at laterally opposing side edges for linear sliding along guides formed on the left and right brackets 22 and 27 respectively. The access door is linearly slidable between (i) a closed position fully spanning the door opening of the common housing below the trough portion to fully block access of animals within the cage to the access openings of the food container or receptacle 4 and thereby block access of the animal to the consumable within the food container and (ii) an open position in which the door opening is substantially unobstructed by the door so that the animal in the cage effectively has full uninhibited access to the food within the trough portion of the food container 4.

The access door can also be accurately positioned in a partially open position in which the door opening is partially blocked by the access door at an intermediate location between the fully open and fully closed positions. In the partially open position, the animal still has access through part of the door opening but the access to the food openings in the food container 4 is partially restricted to increase the burden on the animal to access the food without completely restricting access to the food.

The access door 213 is linearly driven between the various positions noted above by a rotary motor or actuator 215 by a suitable linkage operatively connected between the rotary output of the motor 215 and the linearly slidable access door 213. The linkage comprises a shaft 214 extending laterally between the left and right brackets 22 and 27 which is connected to the motor 215 to drive rotation of the shaft. A gear 210 fixedly mounted on the shaft 214 rotates with the shaft and is supported for meshing engagement with a row of gear teeth formed on the inner surface of the access door 213 to transfer rotational motion of the motor 215 to linear motion of the access door.

A controller is provided for controlling the actuation of the door actuator 215 to open and close the access door 213 according to respective scheduled times stored on the controller. Similarly to the controlled function of the monitoring apparatus 3 described in further detail below, the controller of the control apparatus 2 may comprise one or more processing units for executing programming instructions stored on one or more computer readable memories associated with one or more computer devices including a processing unit 26 forming part of the control apparatus 2, and in some instances further including the processing unit 34 of the monitoring apparatus 3, and in some instances further including the processing of a remote server 8 and/or a separate user computer device 6.

In the illustrated embodiment, the processing unit 26 of the control apparatus is operatively connected to a battery 5 while being supported with the battery above the platform portion of the food container 4. Additional sensors 15 of the control apparatus 2 can be supported at various locations on the common housing for sensing various operating conditions relating to the position of the access door and the performance characteristics of the door actuator 215 and/or one or more environmental conditions relating to the cage.

The controller of the control apparatus functions to receive a food access schedule from a user for storing the scheduled times to open and close the access door on the controller and for subsequently acting on the stored data by preparing instruction signals for the door actuator 215 at appropriate times corresponding to the program schedule for opening, closing or partially opening/closing the access door. The controller is also arranged to communicate with the user computer device 6 by a direct local connection or through a communications network 7 to receive various instructions such as changes to the stored feeding schedule or manual override instructions in which the user can send an instruction from the computer device 6 to actively open or close the access door on command regardless of the currently stored schedule.

The controller of the control apparatus 2 is further arranged to receive sensor data relating to various operating conditions of the control apparatus for comparison to various operating criteria and/or thresholds for various measured values to determine if corrective action is required or if an alert should be generated to advise the user of a malfunction. For example, the controller may be arranged to generate an alert communicated to a user of the apparatus in response to the one or more operating characteristics measured by the one or more sensors meeting criterium or exceeding a prescribed threshold stored on the controller.

In the event that the sensors measure operational conditions that are indicative of an obstruction to closing of the access door, the controller will immediately cease attempting to close the door and instead fully open the access door for a prescribed duration. Upon expiration of the prescribed duration, the controller will automatically generate new signals to attempt to once again close the access door. If an obstruction is once again encountered, the controller may automatically retry closing of the door at expiry of a subsequent prescribed duration, or the controller may alternatively alert the user of the malfunction and cease attempting to close the door.

The controller of the control apparatus includes a data transmission module which allows communication of the processing unit 26 to a local computer 6 through a local network, such as a wireless connection of various forms in some modes. In alternate modes, the processor communicates over a communications network to the user computer device 6 which is located at a remote location. In yet a further instance, the processing unit 26 may communicate over a communication network to a remote server 8 or through the processing unit 34 of the monitoring apparatus 3 to the remote server 8, followed by communication of the remote server to the user computer device 6 directly or back through the communications network 7.

The controller is further arranged to record each actuation of the access door by the door actuator as well as record all sensor data in an event log which may be stored on a local memory associated with the processing unit 26 of the control apparatus 2 or the data may be transmitted in real-time to the remote server 8 or the user computer device 6 for recording the event log at the remote server or the computer device. In each instance, data relating to the event log is in some capacity transmitted to the computer device 6 of the user for subsequent recall by the user as may be desired.

The monitoring apparatus 3 comprises a housing formed by the front and back covers 34 and 35 for supporting the camera unit thereon in the form of one or more cameras and image or light sensors 32. The housing is fully separate from the control apparatus 2 and is intended to be supported on a suitable supporting surface at a location spaced offset laterally to one side of the cage 1. The cameras are directed towards a longitudinal extending side wall of the cage 1 for capturing images having a boundary which is typically calibrated to be substantially aligned with the boundaries of the cage 1.

The monitoring apparatus includes a respective controller or operating module that collectively includes the monitoring of assessing unit 34, a data communication module for communication of the processor 34 over the communications network with the remote server 8 or the user computer device 6 and a memory for storing programming instructions thereon. The processors of the remote server and the user computer device together with programming instructions stored on the respective memories thereof work together with the processor 34 and any programming instructions stored on the monitoring apparatus 3 to collectively provide the function of a controller for the monitoring apparatus 3.

The monitoring apparatus 3 generally functions to capture a time series of images of the animal in the cage, for example capturing one image per second throughout the duration of the operation of the monitoring system, followed by transmitting of the images in real time to the computer device 6 or the remote server 8 for processing. A deep learning algorithm is used to compare the images to various data sets of images of similar animals within similar cages to identify an animal within each captured image as well as identifying the location of the animal relative to the boundaries of the cage.

By comparing each captured image to the next image in a timeseries sequence, determination can be made regarding how much movement the animal has made and the frequency of such movements. The magnitude and frequency of the movements from each image to the next in the timeseries are used as inputs to calculate an overall movement metric representing one or more movements of the animal relative to the cage between the different captured images of the timeseries of images captured by the camera. The one or more movements determined by the processing of the captured images and/or the overall calculated movement metric, can be compared to one or more irregular movement criteria stored on the controller such that the controller can automatically generate an alert to the user if one or more of the compared values meet the corresponding irregular movement criterium to determine an alert.

The sensors 32 associated with the one or more cameras of the monitoring apparatus 3 include light sensors arrange to measure lighting conditions as a further input to the controller of the monitoring apparatus. In this instance the monitoring apparatus can change the performance of the cameras based upon the detected lighting conditions for operating in different modes including capturing images using visible light during daylight modes or capturing infrared images in the absence of visible light during dark or nighttime modes. Additional data identifying whether the image was captured using visible light or infrared can be associated with the images when applying the images to a deep learning algorithm so that the artificial intelligence can make better judgements regarding identification of the animal within the boundaries of the captured image.

All movement data determined from the comparison of the captured images to one another are recorded by the controller for subsequent recall by the user as may be desired. The movement log may be stored on the monitoring apparatus 3 or the data may be transmitted over the communications network to either of the remote server 8 or the user computer device 6 for storage on the remote devices. The controller is further arranged to process the movement data to generate various graphical outputs for display to the user including graphing movement over time in the form of a histogram or generating a heat map of the overall cage in which colour variation is used to distinguish areas within the cage where the movement with greatest frequency and/or magnitude was detected.

As described herein, the control apparatus 2 and the monitoring apparatus 3 may be used independently of one another or may be used in combination on the same cage 1 while being commonly controlled by a common set of programming instructions on the user device 6 which controls aspects of both the control apparatus 2 and the monitoring apparatus 3. In further instances, multiple independent control apparatuses 2 and/or multiple independent monitoring apparatuses 3 may be commonly controlled through a single user interface operating on the user computer device 6.

When the monitoring apparatus is used alone, it may be connected directly to the user computer device 6 which performs the deep learning algorithm for processing the images. Alternatively, the monitoring apparatuses 3 may communicate over a communications network to a remote server which performs the deep learning algorithm for processing the images followed by subsequent transmission of the graphical outputs and output data from the remote server 8 to the user device 6 for communicating the data to the user.

Figure 6:
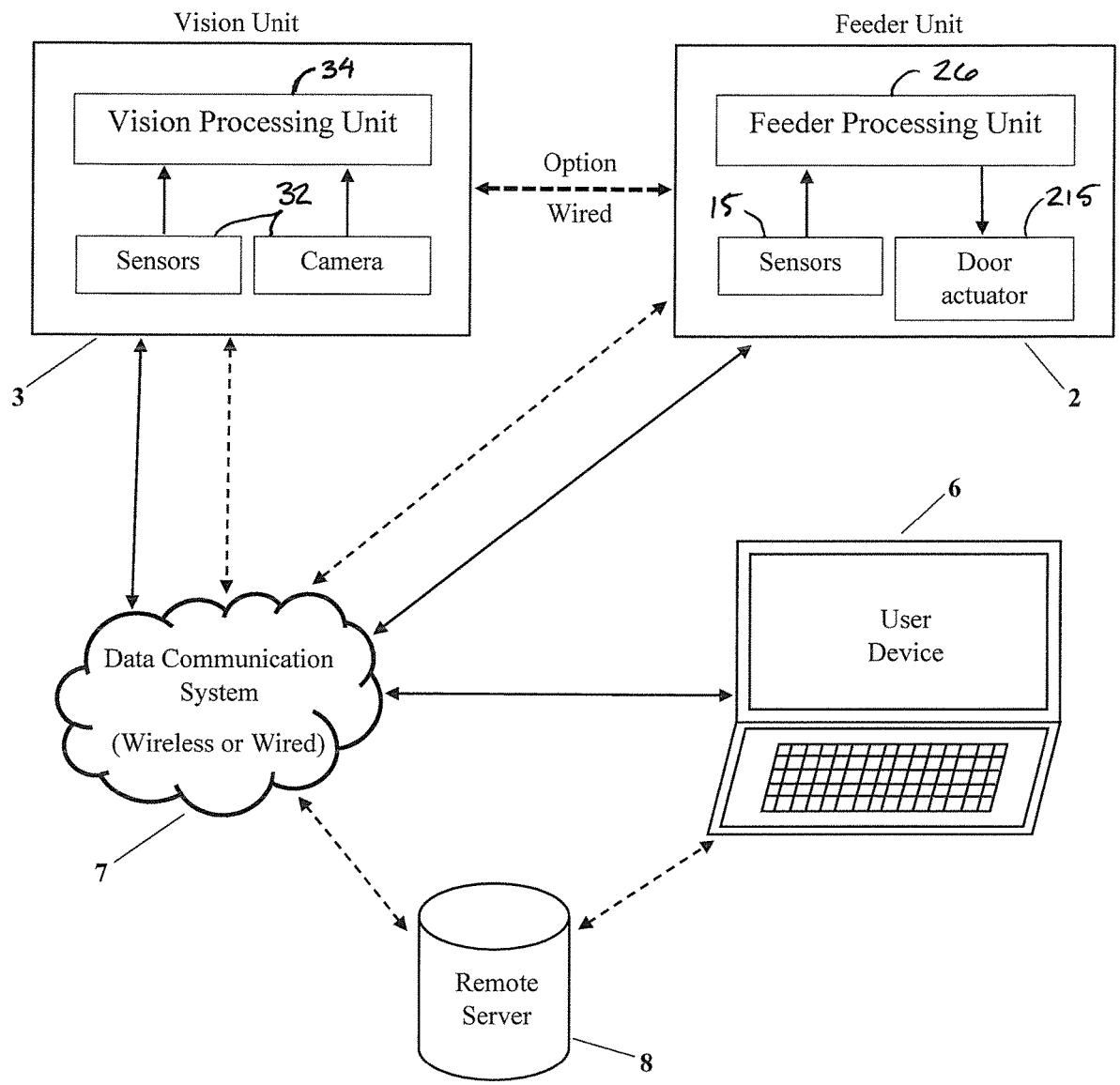
FIG. 6 is a schematic representation of the entire system of the control apparatus and the monitoring apparatus, together with their communication with a user computer and a remote server according to some embodiments.

When the control apparatus 2 is used alone, the control apparatus 2 preferably communicates directly with a user computer 6 so that control of the schedule is provided by the user computer 6; however, upon disconnection of the user computer 6 with the control apparatus 2, the control apparatus 2 can continue functioning autonomously according to the scheduled times stored on the control apparatus itself. Communication of the control apparatus 2 with the computer device 6 is preferably wireless so that no wires interfere with mounting of the lid onto the cage 1. In other instances, the control apparatus 2 communicates over a communications network to a remote server 8 at a remote location for subsequent communication of data from the remote server 8 to the user device 6 through various communication means including optionally through a communications network 7 according to FIG. 6.

When the control apparatus 2 is used together with the monitoring apparatus 3, a wired connection may be formed between the communication apparatus and the monitoring apparatus so that power from the monitoring apparatus can be supplied to the control apparatus to extend the operating duration of the control apparatus while also enabling data to be communicated directly to the processing unit 34 of the monitoring apparatus 3 for subsequent relaying of the data and instructions for the control apparatus through the monitoring apparatus to the computer device 6.

The computer device 6 communicates with the monitoring apparatus 3 and the control apparatus 2 to provide user control to both apparatuses while also providing full access to available data. The graphical interface generated by the programming instructions can be displayed on the user computer device 6 and accepts operating commands from the user for controlling the operation of the monitoring apparatus 3 and the control apparatus 2. In one instance the cameras of the monitoring apparatus can capture a live video stream and relay the video stream in real time for display on the graphical interface on the computer device 6. The graphical interface can also graphically represent the schedule of all scheduled openings and closings of the access door of the control apparatus while providing the user full access to modify the scheduled times as may be desired or to manually override the schedule to open and close the access door as may be desired. The graphical interface operating on the computer device 6 also allows all captured data relating to identified movements of the animal within the cage by the monitoring apparatus 3 to be accessed and viewed on the computer device in various graphical forms including a histogram or a heat map as described above.

The control and monitoring system described herein provides numerous advantages to operators of animal cages for researchers conducting various experiments relating to the animals. In particular, the system ensures health and safety of the laboratory staff as well as the wellness of animals by monitoring of the activity and ensuring accurate control of the access of the animal to consumables including food, water, or medicine at specific scheduled times. The remote access eliminates need to travel to a cage location multiple times a day for operating staff. Depending upon the environment of the animals, various daily tasks related to the animals can also be conducted remotely without exposure to possibly contaminated or radioactive environments. The interface also allows access and control of multiple units through a single interface. The interactive graphical user interface allows the user to perform any task with minimal interactions, while also allowing researchers to track the history of the animal movements and the feeding routine.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A control apparatus for controlling access of an animal in a cage to a consumable, the cage including a stationary receptacle suspended within the cage and supporting the consumable therein such that the consumable is accessible to the animal in the cage through an access opening of the stationary receptacle in which the stationary receptacle comprises a grate formed of bars with gaps between the bars defining said access opening, the control apparatus comprising:
  an access door arranged to be supported for movement relative to the stationary receptacle between a closed position blocking access of the animal in the cage to the access opening of the stationary receptacle and an open position in which the access opening of the stationary receptacle is substantially unobstructed by the access door;
  a door actuator arranged to drive displacement of the access door between the open position the closed position; and
  a controller comprising a memory storing programming instructions thereon and a processor arranged to execute the programming instructions stored on the memory whereby the controller is arranged to actuate the door actuator to open and close the access door according to respective scheduled times stored on the controller.

2. The control apparatus according to claim 1, wherein the controller is further arranged to operate the door actuator to position the access door in an intermediate position partway between the open position and the closed position a wherein access of the animal in the cage to the access opening of the stationary receptacle is partially restricted in the intermediate position.

3. The control apparatus according to claim 1, wherein the cage includes a lid arranged to be seated on a top side of the cage to enclose the cage, the apparatus being arranged to be supported within the cage without interference to the lid enclosing the top side of the cage.

4. The control apparatus according to claim 1, wherein the controller includes a data transmission module arranged for communication with a remote computer device over a communication network, the controller being arranged to change the scheduled times stored on the controller in response to an instruction received from the remote computer device over the communication network.

5. The control apparatus according to claim 1, wherein the controller includes a data transmission module arranged for communication with a remote computer device over a communication network, the controller being arranged to record each actuation of the access door by the door actuator in an event log and transmit the event log to the remote computer device over the communication network.

6. The control apparatus according to claim 1, wherein the apparatus includes one or more sensors arranged to measure one or more operating characteristics of the access door when displacing the access door towards the closed position, and wherein the controller is arranged to instruct the door actuator to open the access door and subsequently fully or partially close the access door after a prescribed duration has expired in response to the one or more operating characteristics measured by the one or more sensors indicating the access door has encountered an obstruction while closing.

7. The control apparatus according to claim 1, wherein the apparatus includes one or more sensors arranged to measure one or more operating characteristics of the access door and/or the door actuator, and wherein the controller is arranged to generate an alert communicated to a user of the apparatus in response to the one or more operating characteristics measured by the one or more sensors exceeding a prescribed threshold stored on the controller.

8. The control apparatus according to claim 1, wherein the access door is supported for linear sliding movement parallel to a plane of the access door between the open position and the closed position.

9. The control apparatus according to claim 8, wherein the door actuator comprises a rotary motor operatively coupled to the access door by a linkage for driving the linear sliding movement of the access door.

10. The control apparatus according to claim 1, wherein the stationary receptacle is suspended in the cage at a location spaced above a bottom a of the cage and wherein the access door is arranged to extend below the stationary receptacle in the closed position.

11. The control apparatus according to claim 1, wherein the access door, the door actuator, and at least a portion of the controller are supported on a common housing of the apparatus, the common housing being arranged to be releasably attached to the receptacle grate.

12. The control apparatus according to claim 1, in combination with a user computer device and a monitoring apparatus, wherein the monitoring apparatus comprises:
  a camera unit arranged to be supported in proximity to the cage, the camera unit including (i) a camera arranged to capture images of the cage with the animal therein, and (ii) a data transmission module arranged to transmit the image data as a time-series of captured images to the computer device; and
  a memory storing programming instructions arranged to be executed by the computer device whereby the computer device is configured to;
    (i) calculate a movement metric representative of movement of the animal relative to the cage over time by processing the time-series of captured images to identify the animal in each image, identifying a location of the animal relative to the cage in each image, comparing the captured images to one another to determine one or more movements of the animal relative cage over time, in which the movement metric is representative of said one or more movements; and
    (ii) communicate with the controller of the control apparatus so as to be arranged to change the scheduled times stored on the controller in response to an instruction received by the controller from the computer device.

13. The control apparatus according to claim 1 in combination with the cage and the stationary receptacle suspended within the cage, wherein the bars of the grate define a trough suspended in fixed relation to the cage, and wherein the access door is supported for movement relative to the trough between the open position and the closed a position to selectively block access to the trough of the stationary receptacle.

14. A control apparatus for controlling access of an animal in a cage to a consumable, the cage including a receptacle suspended within the cage and supporting the consumable therein such that the consumable is accessible to the animal in the cage through an access opening of the receptacle, the control apparatus comprising:
- an access door arranged to be supported for movement relative to the receptacle between a closed position blocking access of the animal in the cage to the access opening of the receptacle and an open position in which the access opening of the receptable is substantially unobstructed by the access door;
- a door actuator arranged to drive displacement of the access door between the open position the closed position; and
- a controller comprising a memory storing programming instructions thereon and a processor arranged to execute the programming instructions stored on the memory whereby the controller is arranged to actuate the door actuator to open and close the access door according to respective scheduled times stored on the controller;
- wherein the access door is supported for linear sliding movement parallel to a plane of the access door between the open position and the closed position.

15. The control apparatus according to claim 14, wherein the door actuator comprises a rotary motor operatively coupled to the access door by a linkage for driving the linear sliding movement of the access door.

16. A control apparatus for controlling access of an animal in a cage to a consumable, the cage including a receptacle suspended within the cage at a location spaced above a bottom of the cage and supporting the consumable therein such that the consumable is accessible to the animal in the cage through an access opening of the receptacle, the control apparatus comprising:
- an access door arranged to be supported for movement relative to the receptacle between a closed position blocking access of the animal in the cage to the access opening of the receptacle and an open position in which the access opening of the receptable is substantially unobstructed by the access door;
- a door actuator arranged to drive displacement of the access door between the open position the closed position; and
- a controller comprising a memory storing programming instructions thereon and a processor arranged to execute the programming instructions stored on the memory whereby the controller is arranged to actuate the door actuator to open and close the access door according to respective scheduled times stored on the controller;
- wherein the access door is arranged to extend below the receptacle in the closed position.

17. A control apparatus for controlling access of an animal in a cage to a consumable, the cage including a receptacle suspended within the cage and supporting the consumable therein such that the consumable is accessible to the animal in the cage through an access opening of the receptacle, wherein the receptacle comprises a receptable grate in which the access opening of the receptacle comprises a plurality of openings between respective bars of the receptacle grate, the control apparatus comprising:
- an access door arranged to be supported for movement relative to the receptacle between a closed position blocking access of the animal in the cage to the access opening of the receptacle and an open position in which the access opening of the receptable is substantially unobstructed by the access door;
- a door actuator arranged to drive displacement of the access door between the open position the closed position;
- a controller comprising a memory storing programming instructions thereon and a processor arranged to execute the programming instructions stored on the memory whereby the controller is arranged to actuate the door actuator to open and close the access door according to respective scheduled times stored on the controller; and
- a common housing supporting the access door, the door actuator, and at least a portion of the controller thereon;
- wherein the common housing is arranged to be releasably attached to the receptacle grate.

18. A control apparatus in combination with a user computer device and a monitoring apparatus, the control apparatus being arranged for controlling access of an animal in a cage to a consumable, the cage including a receptacle suspended within the cage and supporting the consumable therein such that the consumable is accessible to the animal in the cage through an access opening of the receptacle, the control apparatus comprising:
- an access door arranged to be supported for movement relative to the receptacle between a closed position blocking access of the animal in the cage to the access opening of the receptacle and an open position in which the access opening of the receptable is substantially unobstructed by the access door;
- a door actuator arranged to drive displacement of the access door between the open position the closed position; and
- a controller comprising a memory storing programming instructions thereon and a processor arranged to execute the programming instructions stored on the memory whereby the controller is arranged to actuate the door actuator to open and close the access door according to respective scheduled times stored on the controller;
- wherein the monitoring apparatus comprises:
  - a camera unit arranged to be supported in proximity to the cage, the camera unit including (i) a camera arranged to capture images of the cage with the animal therein, and (ii) a data transmission module arranged to transmit the image data as a time-series of captured images to the computer device; and
  - a memory storing programming instructions arranged to be executed by the computer device whereby the computer device is configured to:
    - (i) calculate a movement metric representative of movement of the animal relative to the cage over time by processing the time-series of captured images to identify the animal in each image, identifying a location of the animal relative to the cage in each image, comparing the captured images to one another to determine one or more movements of the animal relative cage over time, in which the movement metric is representative of said one or more movements; and
    - (ii) communicate with the controller of the control apparatus so as to be arranged to change the scheduled times stored on the controller in response to an instruction received by the controller from the computer device.

* * * * *